Figure 2:
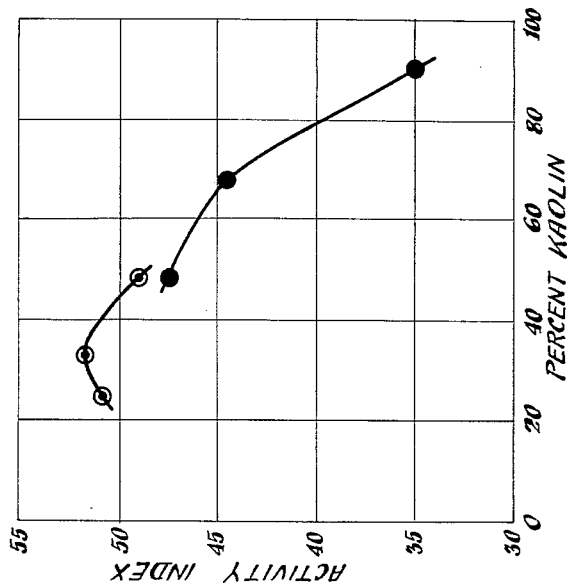

Dec. 20, 1955     T. P. SIMPSON ET AL     2,727,868
PREPARATION OF CATALYST FROM KAOLIN AND SILICA GEL

Filed June 28, 1951

INVENTORS
Thomas P. Simpson
Peter D. Branton
Charles J. Plank
BY Raymond W. Barclay
ATTORNEY

United States Patent Office 2,727,868
Patented Dec. 20, 1955

2,727,868

PREPARATION OF CATALYST FROM KAOLIN AND SILICA GEL

Thomas P. Simpson, Peter D. Branton, and Charles J. Plank, Woodbury, N. J., assignors to Socony Mobil Oil Company, Inc., a corporation of New York Application June 28, 1951, Serial No. 234,092

9 Claims. (Cl. 252—449)

This invention relates to catalytic conversion of hydrocarbons and to an improved method for the manufacture of porous adsorptive catalytic materials useful in promoting hydrocarbon conversion. More particularly, the present invention is concerned with the preparation of an improved cracking catalyst and with processes utilizing the same in which hydrocarbons of lower boiling point and lower molecular weight are produced from heavier petroleum oils of higher boiling point.

While many materials of various composition have heretofore been suggested for use as cracking catalysts, those generally employed in commercial operation comprise, for the most part, composites of silica and alumina. Thus, adsorbent contact masses comprising gels of silica and alumina in intimate association produced by synthetic methods involving gelation or cogelation of these materials have been widely employed as hydrocarbon conversion catalysts.

In addition to synthetic gel-type composites, a number of naturally occurring clays comprising aluminum hydrosilicate, for the most part, have been suggested for use as cracking catalysts. Of the numerous available clays, only some of the bentonite clays belonging to the montmorillonite group and activated by previous acid treatment have been found to be of sufficiently high level of activity to merit consideration in commercial operation. Kaolin clays, when attempted to be used as catalysts in cracking of hydrocarbons, have not demonstrated acceptable commercial results since there were obtained only poor yields in quantity and quality of cracked products, such as gasoline, and comparatively excessive amounts of carbonaceous deposits were formed. Moreover, acid treatment of raw kaolin clays, such as has been employed in activating the aforementioned bentonite clays, is ineffective in raising the catalytic activity thereof to a desired commercially attractive level.

Previous attempts to activate kaolin clays for use as catalysts in promoting hydrocarbon conversion have generally involved a preliminary thermal treatment of the clay at certain elevated temperatures, followed by acid leaching of the thermally treated clay. This activating treatment has sometimes been supplemented during the preliminary heating stage by the addition of a gaseous reactant designed to reduce the iron content of the clay by rendering the same more susceptible to removal during subsequent acid leaching. The acid treatment, in every case, removes a portion of the aluminum content of the clay. On repeated or more drastic treatments with acid, the products so obtained are increasingly impaired in regard to mechanical stability. In addition, because of accompanying extraction of comparatively large quantities of aluminum compounds, the treatment effects a marked decline in catalytic activity, eventually resulting in products of such reduced catalytic activity that they are no longer useful for their intended purpose. Moreover, procedures entailing the step of acid leaching are wasteful since the yield of catalytic material in such instances seldom exceeds 60 to 80 per cent by weight of the original clay.

It is an object of this invention to provide a process for manufacturing a cracking catalyst wherein kaolin clay is employed without encountering the disadvantages inherent in the prior art procedures. It is a further object of this invention to provide an improved catalytic process for hydrocarbon conversion utilizing a stable catalyst prepared from kaolin. A still further object is the provision of a method for preparation of a commercially attractive catalyst.

The above and other objects which will be apparent to those skilled in the art are achieved in accordance with the present invention. Broadly, the process of this invention involves preliminary thermal treatment of kaolin, followed by admixing the thermally pretreated kaolin with silica gel prepared under particularly defined conditions of pH control. The method described herein eliminates the step of acid leaching, heretofore considered essential in activation of kaolin clays for use as hydrocarbon conversion catalysts. By the present process, kaolin in intimate admixture with silica gel has been found to be an efficient cracking catalyst and to provide desirable performance characteristics in the cracking of heavy petroleum hydrocarbons to lighter materials boiling in the range of gasoline. Hydrocarbon conversion processes employing the present catalyst have important advantages distinguishing the same over commercial catalysts in current use derived from acid activatable bentonite clays or from wholly synthetic composites of silica-alumina gel.

Among the advantages demonstrated by the catalysts employed in accordance with the present invention are unexpectedly low initial coke make on heavy stocks and a surprising resistance to abnormal aging and deterioration on continued use. The ratios of gasoline/coke produced from various charge stocks may be substantially improved with the present catalyst and, in fact, the present catalyst has in many instances demonstrated surprisingly better gasoline/coke ratios than commercial synthetic catalysts. The catalysts described herein are also capable of withstanding severe conditions and high regeneration temperatures in practical operation, which, considered together with an indicated longer useful life of the catalyst and significantly improved yields of desired cracked products, constitute important economic advantages in addition to that afforded by the use of a readily available and inexpensive raw material.

It has thus been found, by subjecting a kaolin clay to a preliminary thermal treatment and subsequent intimate admixture thereof with silica gel prepared under particularly defined conditions, that important improvements, particularly in regard to the catalytic properties of the resulting composite, are obtained. Acid leaching, heretofore deemed essential, in activation of kaolin may be dispensed with in accordance with the instant preparation process. The catalysts prepared by the present method, moreover, exhibit an improved selectivity in the cracking of petroleum hydrocarbons, particularly as measured in terms of the ratio of the quantity of gasoline produced from cracking of a hydrocarbon oil to the quantity of coke deposited. Furthermore, the high activity of the kaolin-silica gel catalysts of the present invention is retained over long periods of use as evidenced by their high degree of steam stability.

In practice of the invention, kaolin clay, in either ground or artificially formed physical shape, is calcined as the preliminary step in the treatment. The conditions of calcination include temperatures of 800° F. and upward to 1750° F. or to such temperature short of that at which the clay tends to shrink rapidly or becomes permanently impaired. It is, further, generally necessary that the minimum heating time employed be such as to afford the temperature of the entire mass being treated to reach the treating temperature and a reasonable time thereafter to ensue so that the desired effect is achieved. Ordinarily about four hours treatment has been found to be adequate in practice at 1450° F., although longer periods of treatment may be used. Ordinarily, treatment at the higher temperatures requires relatively shorter time while treatment in the lower temperature range requires a correspondingly longer time of treatment. With different kaolin clays, the best temperature within the described range for obtaining maximum activity may vary so that in individual instances, the preferred calcination temperature employed in practice of the invention may be at the lowest, the highest or at some intermediate temperature levels within the described range or, in some instances, substantially equivalent results may be obtained at the lower and upper temperature levels with less satisfactory results at certain intermediate levels. As a general rule, however, it is preferred to heat treat the kaolin clay at a temperature between about 1300° F. and about 1600° F.

After the thermally treated kaolin has cooled down from its previous calcination temperature, it is intimately admixed in a preferred embodiment of the invention with silica hydrogel. For such admixture, room temperatures may be conveniently employed up to about 110° F. The mixing of kaolin and silica hydrogel may be brought about by any feasible means to afford an active cracking catalyst, providing the two materials are thoroughly intermixed and providing the pH of the silica hydrogel during the period of gelation is maintained below a pH of 5 and preferably at a pH of less than 3. It has been found, as will be apparent from data presented hereinafter, that silica hydrogel prepared at a pH above 5, when mixed with calcined kaolin, does not yield the effective cracking catalysts provided by the procedure of the present invention. It is contemplated that the mixing of the calcined kaolin and silica hydrogel may be achieved by any of a variety of procedures permitting an intimate degree of interdispersion of components. Thus, the mixing of the calcined kaolin and silica hydrogel may be brought about by ball-milling the two components together until thorough admixture thereof has been attained or the mixing may be accomplished by cogelation techniques, that is, by dispersing finely divided calcined kaolin in a silica hydrosol with subsequent gelation of said hydrosol, or finely divided kaolin may be added to one of the reactant solutions from which the silica hydrosol is prepared, followed by hydrosol preparation and gelation, or alternatively the calcined kaolin may be digested with an alkali metal silicate at a moderately elevated temperature, followed by gelation of the digested mixture. It is also possible to admix the calcined kaolin with dried silica gel in the presence of water by ball-milling. In those methods wherein the calcined kaolin is dispersed in a silica hydrosol or reactant used in preparation of said hydrosol, the kaolin is preferably in powder form; that is, the particle size thereof is preferably less than about 75 microns.

The ratio of kaolin to silica hydrogel employed in the present process is such as to adjust the weight ratio of $SiO_2$ to $Al_2O_3$ in the final product to the approximate range of 2.5:1 to 10:1. For a given pH of silica hydrogel preparation within the foregoing critical limits, it has been found that both activity and stability of the resultant catalyst tend to decrease with an excessive quantity of kaolin. It is accordingly preferred that the catalyst described herein contain at least about 10 per cent up to about 50 per cent by weight of kaolin and more particularly between about 20 per cent and about 50 per cent of kaolin.

The initial product obtained, upon mixing silica hydrogel with calcined kaolin as described above, is suitably water-washed to remove soluble material. If the composite contains alkali metal in soluble or exchangeable form, the same may be removed by washing the composite with acidic solutions or solutions of ammonium salts. Other metal salts or oxides may be incorporated into the composite by adsorption or base exchange, including, for example, those of zirconium, beryllium, chromium, magnesium, aluminum, manganese, etc. It has been found that base-exchanging considerably improves the hardness of the catalysts and also improves the activity and stability to some extent. The improvement in hardness is believed due to the removal of zeolitic alkali metal, ordinary zeolitic sodium, since the increase in hardness is approximately proportional to the degree of elimination of zeolitic alkali metal. The particular nature and valence of the exchanging cation does not appear to be significant since, other factors being equal, substantially identical results are achieved upon base exchange with a monovalent, divalent, or trivalent cation.

The composite of calcined kaolin and silica hydrogel obtained in accordance with any of the methods above described may be made into a catalyst or other contact mass and finished in any known or desired manner which may include in any order of sequence washing, base-exchanging, drying and forming into desired shapes and sizes. For catalyst use, the composite should be finally calcined at a temperature above 500° F. in air or steam or in mixtures of the same, although, if desired, the calcination step may be effected in the use of the catalyst incident to the high temperatures encountered in hydrocarbon conversion processes and regeneration of the catalyst.

Irregular masses or pieces of the composite contact mass may be formed by suitably breaking up a dry filter cake, or more regular sizes and shapes may be obtained by tableting, molding, casting, or extruding the wet or wetted comminuted material. In those cases wherein the calcined kaolin, in finely divided form, is incorporated in a silica hydrosol or reactant used in preparation of said hydrosol, the composite is desirably allowed to set as droplets to a hydrogel in a static or turbulent water-immiscible liquid to produce spheroidal contact particles of the "bead" type.

In the use of the catalysts according to the present invention, no change in conditions of treatment of the hydrocarbon to be processed is rendered necessary. The usual conditions as to time, temperature, etc., can be followed if desired. As an example of a TCC operation, cracking may be carried out at a temperature of 850° F. to 950° F., employing a space rate (volume of charge, liquid basis, per volume of catalyst per hour) of about 1.5 and a pressure of about 10 pounds per square inch gauge. The temperature may broadly vary in the range of about 700° F. to about 1200° F., the space rate within the range of about 0.5 to about 10, and pressures may be employed from about atmospheric or slightly lower up to about 100 pounds per square inch or even higher. The ratio of catalyst to oil charge is generally within the range of 0.5 to 20 and preferably between about 1 and about 8. In processes other than TCC, such as fixed bed, the conditions employed may be such as to subject the oil to substantially equivalent conditions as those set out above in connection with the TCC process.

As a general rule, the active catalysts prepared by the process set forth hereinabove show desirable product distribution from the standpoint of lower molecular weight liquid hydrocarbons present in the gasoline fraction. Because of the high heat stability of the present catalysts, the throughput of charge can be increased without introduction of damaging regeneration temperatures to obtain required burn-off of carbonaceous deposit in the cycle, since physical properties of the kaolin-silica gel catalyst lead to approximately even regeneration temperatures throughout the mass without undesired localized zone-burning.

The terms "kaolin" or "kaolin clay" as employed herein include those clays which in the raw state contain, as the principal clay material constituent present therein, kaolinite, halloysite, indianaite, dickite, nacrite, or anauxite. These minerals are all hydrous aluminum silicates in their uncalcined form and may be represented by the general formula: $Al_2O_3 \cdot 2SiO_2 \cdot nH_2O$, $n$ being generally 2. The indicated formula gives a weight ratio of $SiO_2$ to $Al_2O_3$ of about 1.16 and the various naturally occurring clays utilized in the instant process generally have an $SiO_2$ to $Al_2O_3$ ratio of about 1.0 to about 1.5.

In the following examples, notations of catalytic activity are expressed in terms of the standard test (Cat-A method) described by Alexander and Shimp in National Petroleum News, Technical Section, August 2, 1944, at page R-537. In accordance with that method, a standard light East Texas gas oil is contacted with a catalyst at a temperature of approximately 800° F. under atmospheric pressure and at a liquid space rate of 1.5 (volume charge/volume of catalyst/per hour) for a ten-minute operation. The volume of gasoline of 410° F. cut point is measured and expressed as a percentage of the volume of oil charge, thereby designating the characteristic activity of a catalyst. The quantity of carbonaceous deposit formed on the catalyst is also measured and expressed in terms of weight per cent of charge. The weight per cent of gas and its specific gravity is also determined in this test.

EXAMPLE 1

McNamee clay from Bath County, S. C. was used in this example and had the following composition on a raw and anhydrous basis, respectively:

|  | Percent | |
|---|---|---|
| $Al_2O_3$ | 41.7 | 48.5 |
| $SiO_2$ | 42.4 | 49.3 |
| $Fe_2O_3$ | 0.5 | 0.6 |
| $TiO_2$, $Na_2O$ | 1.4 | 1.6 |
| $H_2O$ | 14.0 | |

The clay was heated at a temperature of 1450° F. for a period of approximately 16 hours.

One hundred ten grams of the calcined kaolin were ball-milled with a silica hydrogel which had been prepared at a pH of 0, by mixing 490 cc. of sodium silicate (0.221 gram $SiO_2$ and 0.069 gram $Na_2O$ per cc.) with 385 cc. of water and 356 cc. of 19 N $H_2SO_4$ at a temperature of about 5–10° C. The gelation time using the aforesaid concentrations was 50 seconds. Ball-milling was carried out over a period of about 4 hours. The resulting gelled product was then washed with water, dried at a temperature of about 280° F. and finally calcined at a temperature of 1050° F. to yield a composite containing an approximately equal weight of kaolin and silica and having an alumina content of about 25% by weight.

EXAMPLE 2

One hundred seventy-eight grams of the calcined kaolin of Example 1 were ball-milled over a period of about 6 hours with silica hydrogel prepared at a pH of 6.7 and a temperature of 5° C. by mixing a solution of 800 cc. of sodium silicate (0.221 gram $SiO_2$ and 0.069 gram $Na_2O$ per cc.) in 1368 cc. of water with 1368 cc. of 1.25 N HCl and base-exchanged with a 1% aqueous solution of ammonium chloride. The resulting ball-milled composite of calcined kaolin and silica hydrogel was water-washed, dried, and calcined at 1050° F. to yield a composite containing an approximately equal weight of kaolin and silica and having an alumina content of about 25% by weight.

The stability, surface area, density and cracking characteristics of the above catalysts as well as those of the initial calcined kaolin are set forth below:

*Table I*

| Example Number | Status | Surface Area, sq. m./g. | Bulk Density | Cat-A Cracking Test Results | | | | | |
|---|---|---|---|---|---|---|---|---|---|
| | | | | Gas, Wt. Percent | Gas Gravity (Air=1) | Coke, Wt. Percent | 300° F. E. P. Gasoline, Vol. Percent | 410° F. E. P. Gasoline, Vol. Percent | Gasoline-to-Coke Ratio |
| | Calcined Kaolin | 14 | 1.00 | 1.7 | 1.12 | 0.8 | 12.6 | 20.8 | 26.0 |
| 1 | Original Kaolin-Silica Gel Composite | 426 | 0.51 | 5.8 | 1.46 | 2.4 | 28.5 | 40.2 | 16.8 |
| | Steam-treated¹ Kaolin-Silica Gel Composite | 182 | 0.54 | 1.5 | 1.14 | 0.8 | 16.4 | 25.2 | 31.5 |
| 2 | Original Kaolin-Silica Gel Composite | 232 | 0.43 | 2.1 | 1.36 | 0.7 | 17.6 | 25.5 | 36.4 |
| | Steam-treated¹ Kaolin-Silica Gel Composite | 181 | 0.44 | 1.1 | 1.09 | 0.5 | 10.4 | 17.4 | 34.8 |

¹ Steam treatment for 10 hours at 1,200° F. in 100% steam at atmospheric pressure.

From the above tabulated results, it will be noted that the catalyst of Example 1 prepared from silica hydrogel having a pH of 0 possessed a distinctly greater surface area than the calcined kaolin which had not been admixed with silica hydrogel or the catalyst of Example 2 wherein a silica hydrogel having a pH of 6.7 was used in preparation. It is further to be noted that the catalyst of Example 1 showed a much greater activity index (per cent volume yield of 410° F. E. P. gasoline) than the catalyst of Example 2 which, in fact, exhibited only a minor improvement over the straight calcined kaolin.

EXAMPLE 3

One hundred ten grams of finely divided calcined kaolin of Example 1, capable of passing through a 200 mesh screen, were dispersed in a solution of 490 cc. of sodium silicate (0.221 gram of $SiO_2$ and 0.069 gram $Na_2O$ per cc.) in 385 cc. of water and subsequent gelation of the mixture with 350 cc. of 19 N $H_2SO_4$ was effected at a pH of approximately 0, the temperature being about 5–10° C. The resulting product was water-washed, dried, and calcined at 1050° F. to yield a composite wherein the weight ratio of tempered kaolin to silica (dry basis) was approximately 1:1 corresponding to an alumina content of about 25% by weight.

The influence of pH of preparation on the activity and stability of the present kaolin-silica gel cracking catalysts is apparent from the results achieved with the catalysts of Examples 3 to 10 set forth below. The catalysts of Examples 4 to 10 were prepared by the procedure of Example 3 with the amount of sulfuric acid being so adjusted as to give the desired pH. The weight ratio of tempered kaolin to silica (dry basis) was approximately 1:1 for each catalyst.

Table II

| Example No. | Status | pH | Bulk Density | Cat-A Results ||||| 
|---|---|---|---|---|---|---|---|---|
| | | | | Gas Gravity | Gas, Percent Wt. | Coke, Percent Wt. | 300° F. E. P. Gasoline, Percent Vol. | Activity Index |
| 3 | Original Kaolin-Silica Gel Composite | 0 | 0.56 | 1.54 | 6.2 | 2.5 | 30.0 | 42.2 |
| | Steam-treated [1] Kaolin-Silica Gel Composite | | 0.60 | 1.35 | 2.1 | 1.0 | 18.6 | 28.8 |
| 4 | Original Kaolin-Silica Gel Composite | 0.5 | 0.74 | 1.63 | 17.0 | 6.0 | 37.3 | 49.1 |
| | Steam-treated [1] Kaolin-Silica Gel Composite | | 0.72 | 1.36 | 3.6 | 1.1 | 23.4 | 33.4 |
| 5 | Original Kaolin-Silica Gel Composite | 2.5 | 0.56 | 1.61 | 11.4 | 4.0 | 35.4 | 47.4 |
| | Steam-treated [1] Kaolin-Silica Gel Composite | | 0.65 | 1.34 | 2.8 | 0.8 | 18.9 | 28.2 |
| 6 | Original Kaolin-Silica Gel Composite | 3.0 | 0.63 | 1.60 | 10.0 | 3.7 | 34.6 | 46.8 |
| | Steam-treated [1] Kaolin-Silica Gel Composite | | 0.71 | 1.26 | 2.3 | 0.5 | 16.1 | 24.1 |
| 7 | Original Kaolin-Silica Gel Composite | 4.0 | 0.49 | 1.48 | 8.9 | 2.6 | 32.9 | 44.9 |
| | Steam-treated [1] Kaolin-Silica Gel Composite | | 0.54 | 1.36 | 2.2 | 0.8 | 18.1 | 27.6 |
| 8 | Original Kaolin-Silica Gel Composite | 5.0 | 0.49 | 1.48 | 5.5 | 2.0 | 20.4 | 41.9 |
| | Steam-treated [1] Kaolin-Silica Gel Composite | | 0.50 | 1.23 | 2.0 | 0.7 | 6.9 | 26.3 |
| 9 | Original Kaolin-Silica Gel Composite | 5.6 | 0.35 | 1.18 | 1.5 | 0.6 | 8.6 | 16.3 |
| | Steam-treated [1] Kaolin-Silica Gel Composite | | 0.39 | 1.11 | 1.1 | 0.5 | 6.0 | 13.0 |
| 10 | Original Kaolin-Silica Gel Composite | 7.1 | 0.44 | 1.05 | 0.5 | 0.4 | | 5.7 |

[1] Steam treatment for 10 hours at 1,200° F. in 100% steam at atmospheric pressure.

Figure 1:
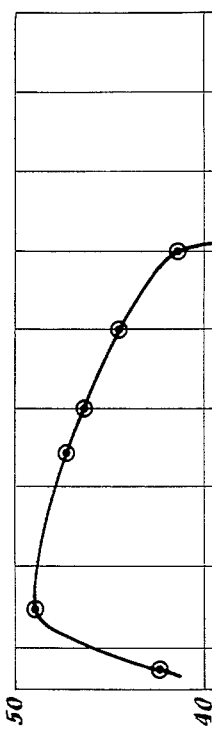

From the foregoing table, it will be seen that the pH at which gelation is effected is an extremely important factor in influencing the activity and stability of the resulting catalytic composite. Catalysts with an activity index above 40 (initial) may be prepared at pH up to and including a pH of 5. Beyond that range, there is a distinctly sharp drop in activity, as will be evident from the results presented graphically in Figure 1 of the attached drawing. Referring more particularly to Figure 1, where activity index of the catalyst is plotted against pH of preparation, it will be noted that there is a sharp downward break in the curve for activity at a pH of greater than 5. It will further be seen that the most active catalysts are those prepared at a pH below 3, generally within a pH range of −1 to 3, the optimum being a catalyst prepared at pH of approximately 0.5.

The effect of the weight ratio of kaolin to silica on the activity and stability of the instant catalysts is evident from the results achieved with the catalysts set forth in Table III below, wherein the kaolin:silica ratio was varied. The catalysts of Examples 11 to 14 were prepared by the procedure of Example 3 with the amounts of sodium silicate and kaolin being so adjusted as to give the desired kaolin to silica ratios.

Table III

| Example No. | Status | pH | Kaolin: Silica Ratio | Bulk Density | Cat-A Results ||||| 
|---|---|---|---|---|---|---|---|---|---|
| | | | | | Gas Gravity | Gas, Percent Wt. | Coke, Percent Wt. | 300° F. E. P. Gasoline, Percent Vol. | Activity Index |
| 11 | Original Kaolin-Silica Gel Composite | 0.5 | 20:80 | 0.84 | 1.68 | 17.2 | 7.0 | 38.3 | 50.8 |
| | Steam-treated [1] Kaolin-Silica Gel Composite | | | 0.92 | 1.59 | 3.4 | 1.1 | 21.9 | 31.9 |
| 12 | Original Kaolin-Silica Gel Composite | 0.5 | 30:70 | 0.72 | 1.67 | 18.7 | 7.0 | 39.4 | 51.6 |
| | Steam-treated [1] Kaolin-Silica Gel Composite | | | 0.81 | 1.42 | 4.1 | 1.3 | 22.7 | 33.5 |
| 4 | Original Kaolin-Silica Gel Composite | 0.5 | 50:50 | 0.74 | 1.63 | 17.0 | 6.0 | 37.3 | 49.1 |
| | Steam-treated [1] Kaolin-Silica Gel Composite | | | 0.72 | 1.36 | 3.6 | 1.1 | 23.4 | 33.4 |
| 5 | Original Kaolin-Silica Gel Composite | 2.5 | 50:50 | 0.56 | 1.61 | 11.4 | 4.0 | 35.4 | 47.4 |
| | Steam-treated [1] Kaolin-Silica Gel Composite | | | 0.65 | 1.34 | 2.8 | 0.8 | 18.9 | 28.2 |
| 13 | Original Kaolin-Silica Gel Composite | 2.5 | 70:30 | 0.61 | 1.52 | 9.1 | 3.4 | 32.8 | 44.7 |
| | Steam-treated [1] Kaolin-Silica Gel Composite | | | 0.61 | 1.09 | 1.4 | 0.6 | 14.2 | 22.4 |
| 14 | Original Kaolin-Silica Gel Composite | 2.5 | 90:10 | 0.58 | 1.43 | 5.0 | 1.9 | 24.8 | 35.0 |
| | Steam-treated [1] Kaolin-Silica Gel Composite | | | 0.58 | 1.10 | 1.3 | 0.6 | 10.7 | 18.2 |

[1] Steam treatment for 10 hours at 1,200° F. in 100% steam at atmospheric pressure.

From the above table, it will be seen that the ratio of kaolin to silica is a factor influencing the activity and stability of the resulting catalysts. For a given pH of preparation, both acitvity and stability tend to decrease with an increasing kaolin content. Best results within the low preferred pH range are obtained with catalysts containing up to about 50% by weight of calcined kaolin, preferably between about 20 and about 50% by weight. The influence of kaolin content on the activity index of the catalyst is shown graphically in Figure 2 of the drawing, wherein inactivity index is plotted against percentage weight kaolin in the catalyst. It will be noted that with catalysts prepared both at a pH of 0.5 and a pH of 2.5, the activity index falls off with an increasing content of kaolin. The catalysts prepared by the present method accordingly preferably contain a weight ratio of calcined kaolin to silica gel not in excess of 1.

As pointed out hereinabove, the removal of zeolitic alkali metal by base exchange of the catalytic composite initially obtained upon gelation results in a considerable increase in hardness characteristics of the final catalyst. The influence of base-exchanging with removal of zeolitic sodium on the hardness, activity and stability of present catalysts are shown by the results of Table IV below. The catalysts of Examples 16 to 19 were prepared by the procedure of Example 3 with a base-exchanging step following gelation. Base-exchanging was carried out with 2% by weight aqueous solutions of NH4Cl (Examples 16 and 17), MgCl2 (Example 18) and Al2(SO4)3 (Example 19), respectively. The hardness index of the catalysts was determined by a standard test involving the subjecting of an 80 cc. catalyst sample of particle size from 4000 to 6350 microns (#3 to #5 mesh), which had been previously tempered for 3 hours at 1050° F. in a dry air atmosphere, to a one-hour attrition (tumbling) with eight steel balls of 15/16 in an inch of diameter, in a container rotating at 80 R. P. M. Under these conditions, the hardness index represented the proportion (in per cent weight) of residual catalyst of particle size greater than 3360 microns (#6 mesh). The pH of preparation of each of the catalysts was within the range 2.5 to 3.

is of little apparent significance since the hardness increase is approximately proportional to the degree of elimination of sodium regardless of the nature in which said sodium is removed. Base-exchanging further tends to improve the activity and stability of the present catalysts, as will be evident from a comparison of the results of Examples 13 and 16 and a comparison of the results of Example 6 with those of Examples 17 to 19. In order to achieve a hard catalytic composite of improved cracking characteristics in accordance with the present procedure, it is preferred to maintain the alkali metal content of instant catalysts below about 0.10%.

It has been previously noted that intimate admixing of the calcined kaolin and silica hydrogel may be accomplished by any of a variety of procedures to yield an active cracking catalyst providing the pH of gelation is less than 5. In Table V set forth below, comparative results obtained utilizing differing methods for bringing about desired admixture of the calcined kaolin and silica hydrogel are shown. In Example 1 described above, mixing was effected by ball-milling the kaolin with previously prepared silica hydrogel. In Example 3 described above, mixing was achieved by cogelation of a suspension of finely divided kaolin in sodium silicate. In Example 15, calcined kaolin was digested with sodium silicate at a moderately elevated temperature followed by gelation. More specifically, one hundred fifty grams of calcined kaolin previously heat-treated at a temperature of 1450° F. for a period of 16 hours were mixed with 700 cc. of sodium silicate (0.213 gram $SiO_2$ and 0.067 gram $Na_2O$ per cc.), and the resulting mixture was maintained at a temperature of 200° F. for a period of 16 hours. The digested mixture of kaolin and sodium silicate so obtained was then gelled at a pH of 0 and a temperature of 5–10° C. by the addition of 1015 cc. of 19 N $H_2SO_4$. The resulting composite was water-washed, dried, and calcined at 1050° F.

Table IV

| Example No. | Status | Kaolin:Silica Ratio | Base Exchange Cation | Percent Na | Hardness Index | Bulk Density | Cat-A Results | | | | |
|---|---|---|---|---|---|---|---|---|---|---|---|
| | | | | | | | Gas Gravity | Gas, Percent Wt. | Coke, Percent Wt. | 300° F. E. P. Gasoline, Percent Vol. | Activity Index |
| 13 | Original Kaolin-Silica Gel Composite | 70:30 | | 0.25 | | 0.61 | 1.52 | 9.1 | 3.4 | 32.8 | 44.7 |
| | Steam-treated [1] Kaolin-Silica Gel Composite | | | | 21 | 0.61 | 1.09 | 1.4 | 0.6 | 14.2 | 22.4 |
| 16 | Original Kaolin-Silica Gel Composite | 70:30 | NH4+ | 0.14 | | 0.62 | 1.64 | 11.1 | 4.1 | 33.5 | 46.3 |
| | Steam-treated [1] Kaolin-Silica Gel Composite | | | | 27 | 0.61 | 1.31 | 2.1 | 0.8 | 17.7 | 25.8 |
| 6 | Original Kaolin-Silica Gel Composite | 50:50 | | 0.21 | | 0.63 | 1.60 | 10.0 | 3.7 | 34.6 | 46.8 |
| | Steam-treated [1] Kaolin-Silica Gel Composite | | | | 23 | 0.71 | 1.26 | 2.3 | 0.5 | 16.1 | 24.1 |
| 17 | Original Kaolin-Silica Gel Composite | 50:50 | NH4+ | 0.07 | | 0.69 | 1.61 | 13.7 | 5.1 | 36.5 | 49.6 |
| | Steam-treated [1] Kaolin-Silica Gel Composite | | | | 63 | 0.71 | 1.35 | 3.6 | 1.1 | 22.9 | 32.1 |
| 18 | Original Kaolin-Silica Gel Composite | 50:50 | Mg++ | 0.07 | | 0.69 | 1.66 | 18.0 | 5.6 | 36.4 | 48.3 |
| | Steam-treated [1] Kaolin-Silica Gel Composite | | | | 65 | 0.72 | 1.40 | 3.2 | 1.1 | 22.5 | 32.0 |
| 19 | Original Kaolin-Silica Gel Composite | 50:50 | Al+++ | 0.05 | | 0.69 | 1.63 | 16.5 | 6.6 | 36.7 | 49.2 |
| | Steam-treated [1] Kaolin-Silica Gel Composite | | | | 67 | 0.73 | 1.42 | 3.5 | 1.2 | 23.5 | 33.0 |

[1] Steam treatment for 10 hours at 1,200° F. in 100% steam at atmospheric pressure.

From the above tabulated results, it will be seen that the hardness of the catalysts which have undergone base exchange during preparation is distinctly improved over those catalysts in which base exchange was absent. It will further be noted, from a comparison of Examples 17 to 19, that the character of the base exchange cation The comparative cracking data for each of these catalysts using the Cat-A method are tabulated below. The pH of gelation in each instance was approximately 0 and each of the resulting composites had a kaolin:silica ratio of about 1:1.

Table V

| Example No. | Status | Bulk Density | Cat-A Results ||||| 
|---|---|---|---|---|---|---|---|
| | | | Gas Gravity | Gas, Percent Wt. | Coke, Percent Wt. | 300° F. E. P. Gasoline, Percent Vol. | Activity Index |
| 1 | Original Kaolin-Silica Gel Composite | 0.51 | 1.46 | 5.6 | 2.4 | 28.5 | 40.2 |
| | Steam-treated[1] Kaolin-Silica Gel Composite | 0.54 | 1.14 | 1.5 | 0.8 | 16.4 | 25.2 |
| 3 | Original Kaolin-Silica Gel Composite | 0.56 | 1.54 | 6.2 | 2.5 | 30.0 | 42.2 |
| | Steam-treated[1] Kaolin-Silica Gel Composite | 0.60 | 1.35 | 2.1 | 1.0 | 18.6 | 28.8 |
| 15 | Original Kaolin-Silica Gel Composite | 0.76 | 1.51 | 14.4 | 5.2 | 33.8 | 45.4 |
| | Steam-treated[1] Kaolin-Silica Gel Composite | 0.79 | 1.26 | 3.6 | 1.5 | 22.7 | 31.8 |

[1] Steam treatment for 10 hours at 1,200° F. in 100% steam at atmospheric pressure.

From the foregoing results, it will be noted that the first two methods of mixing kaolin and silica hydrogel (Examples 1 and 3) yield catalysts of substantially identical characteristics while the third (Example 15) gives somewhat more gas and coke. From a practical manufacturing standpoint, however, the cogelation technique typified by the procedure of Example 3 is accorded preference.

We claim:

1. A method for producing a porous adsorptive catalytic material, which comprises activating kaolin by calcination at a temperature not less than 800° F., intimately admixing said calcined kaolin in an amount corresponding to less than 50% by weight of the total solids in the subsequently dried product with silica hydrogel prepared at a gelation pH of less than 5 and drying the composite so obtained.

2. A method for producing a porous adsorptive catalytic material, which comprises activating kaolin by calcination at a temperature not less than 800° F., ball-milling said calcined kaolin in an amount corresponding to less than 50% by weight of the total solids in the subsequently dried product with silica hydrogel prepared at a gelation pH of less than 5 and drying the resulting ball-milled composite.

3. In a process for producing a cracking catalyst from kaolin which has undergone thermal pretreatment at a temperature in the approximate range 800 to 1750° F., the step which comprises intimately admixing said kaolin with silica hydrogel having a pH of less than 3 in an amount such that the weight ratio of $SiO_2$ to $Al_2O_3$ in the resulting product is in the approximate range of 2.5:1 to 10:1.

4. A method for making a porous adsorptive catalyst, which comprises activating kaolin by calcination at a temperature not less than 800° F., mixing said kaolin in an amount corresponding to less than 50% by weight of the total solids in the subsequently dried product with a silica hydrosol having a pH of less than 5, allowing said hydrosol to set to a hydrogel and drying the hydrogel so obtained.

5. A method for making a porous adsorptive catalyst, which comprises activating kaolin by calcination at a temperature not less than 800° F., mixing said kaolin in an amount furnishing between about 10 and about 50% by weight of the total solids in the subsequently dried product with an alkali metal silicate, acidifying the resulting mixture to a pH of less than 5, whereby a hydrogel is formed, base-exchanging zeolitic alkali metal from said hydrogel and drying the resulting base-exchanged hydrogel.

6. A method for making a porous adsorptive catalyst, which comprises activating kaolin by calcination at a temperature in the approximate range 800 to 1750° F., mixing said kaolin in an amount furnishing between about 20 and about 50% by weight of the total solids content in the subsequently dried product with an alkali metal silicate, acidifying the resulting mixture to a pH of less than 3, whereby a hydrogel is formed, base-exchanging zeolitic alkali metal from said hydrogel and drying the base-exchanged hydrogel to a hard gel.

7. In a process for producing a cracking catalyst from kaolin which has undergone thermal pretreatment at a temperature in the approximate range 800 to 1750° F., the step which comprises ball-milling said kaolin with silica hydrogel having a pH of less than 5 in an amount such that the weight ratio of $SiO_2$ to $Al_2O_3$ in the resulting product is in the approximate range of 2.5:1 to 10:1.

8. A process for producing a porous adsorptive catalytic material, which comprises activating kaolin by calcination at a temperature in excess of 800° F., intimately admixing said calcined kaolin in an amount corresponding to less than 50% by weight of the total solids in the subsequently dried product with silica hydrogel prepared at a gelation pH of about 0.5 and drying the composite so obtained.

9. A method for making a porous adsorptive catalyst, which comprises activating kaolin by calcination at a temperature in the approximate range 1300 to 1600° F., mixing said kaolin in an amount furnishing between about 20 and about 50% by weight of the total solids in the subsequently dried product with an alkali metal silicate, acidifying the resulting mixture to a pH of about 0.5, whereby a hydrogel is formed, base-exchanging zeolitic alkali metal from said hydrogel, and drying the base-exchanged hydrogel to a hard gel.

References Cited in the file of this patent

UNITED STATES PATENTS

| | | |
|---|---|---|
| 1,783,396 | Travers | Dec. 2, 1930 |
| 2,230,464 | Marschner | Feb. 4, 1941 |
| 2,331,353 | Stoewener et al. | Oct. 12, 1943 |
| 2,369,001 | Ahlberg et al. | Feb. 6, 1945 |
| 2,374,313 | Veltman | Apr. 24, 1945 |
| 2,454,942 | Pierce et al. | Nov. 30, 1948 |
| 2,466,046 | Shabaker et al. | Apr. 5, 1949 |
| 2,481,841 | Hemminger | Sept. 13, 1949 |
| 2,487,065 | Milliken | Nov. 8, 1949 |
| 2,504,158 | Shabaker | Apr. 18, 1950 |